(12) United States Patent
Kapoor et al.

(10) Patent No.: US 9,886,490 B1
(45) Date of Patent: Feb. 6, 2018

(54) COMMON EXTRACT STORE

(71) Applicant: Numerify, Inc., Cupertino, CA (US)

(72) Inventors: Rahul Kapoor, Cupertino, CA (US); Gaurav Rewari, Cupertino, CA (US); Rohan Aranha, Redwood City, CA (US); Sadanand Sahasrabudhe, Rockville, MD (US)

(73) Assignee: Numerify, Inc., Cupertino, DE (US)

( * ) Notice: Subject to any disclaimer, the term of this patent is extended or adjusted under 35 U.S.C. 154(b) by 173 days.

(21) Appl. No.: 14/215,547

(22) Filed: Mar. 17, 2014

(51) Int. Cl.
*G06F 17/30* (2006.01)

(52) U.S. Cl.
CPC .. *G06F 17/30563* (2013.01); *G06F 17/30292* (2013.01)

(58) Field of Classification Search
CPC ............... G06F 17/30563; G06F 17/30292
USPC ............................................... 707/602
See application file for complete search history.

(56) References Cited

U.S. PATENT DOCUMENTS

| 7,519,628 | B1 * | 4/2009 | Leverett | G06F 17/30067 |
| 7,681,185 | B2 | 3/2010 | Kapoor et al. | |
| 7,730,031 | B2 * | 6/2010 | Forster | G06F 11/1451 |
| | | | | 707/625 |
| 7,987,159 | B2 | 7/2011 | Gopal et al. | |
| 8,165,221 | B2 * | 4/2012 | Zheng | H03M 7/00 |
| | | | | 375/240.25 |
| 8,412,899 | B2 * | 4/2013 | Bryant | G06F 11/1448 |
| | | | | 711/162 |
| 8,473,520 | B1 * | 6/2013 | Tsang | G06F 17/30572 |
| | | | | 707/791 |
| 8,554,734 | B1 * | 10/2013 | Chatterjee | G06F 11/1451 |
| | | | | 707/640 |
| 2003/0088573 | A1 * | 5/2003 | Stickler | G06F 17/30867 |
| 2003/0093434 | A1 * | 5/2003 | Stickler | G06F 8/24 |
| 2003/0097365 | A1 * | 5/2003 | Stickler | G11B 27/32 |
| 2003/0105746 | A1 * | 6/2003 | Stickler | G06F 17/30011 |
| 2004/0093555 | A1 * | 5/2004 | Therrien | G06F 11/1448 |
| | | | | 714/805 |
| 2005/0015716 | A1 * | 1/2005 | Lavoie | G06F 17/245 |
| | | | | 715/255 |
| 2006/0123059 | A1 * | 6/2006 | Zamfiroiu | G06F 17/30289 |
| 2006/0235831 | A1 * | 10/2006 | Adinolfi | G06Q 40/00 |
| 2008/0228795 | A1 * | 9/2008 | Lomet | G06F 17/30312 |
| 2009/0063949 | A1 * | 3/2009 | Duan | G06F 17/2211 |
| | | | | 715/234 |

(Continued)

*Primary Examiner* — Pierre Vital
*Assistant Examiner* — Nargis Sultana
(74) *Attorney, Agent, or Firm* — Rahman LLC

(57) ABSTRACT

Approaches for a persistent data store that may be used to service data queries originating from data warehousing applications, operational reporting applications, or data archiving and data feed applications. At periodic intervals, data may be extracted from one or more disparate data sources. The extracted data may be stored in the persistent data store in a tabular format. A backward delta data set is generated. The backward delta data set identifies what additions, deletions, and modifications need to be made to the data stored in the persistent data store to return the data to a most recent version. Backward delta data sets are stored and maintained in accordance with a policy that instructs two or more backward delta data sets, associated with a continuous interval of time, be combined into a single backward delta data set after the expiration of a specified amount of time.

15 Claims, 5 Drawing Sheets

(56) References Cited

U.S. PATENT DOCUMENTS

| | | | |
|---|---|---|---|
| 2011/0125705 A1* | 5/2011 | Aski | G06F 8/30 |
| | | | 707/602 |
| 2011/0208755 A1* | 8/2011 | Fiske | G06F 11/1448 |
| | | | 707/751 |
| 2013/0054532 A1* | 2/2013 | Schreter | G06F 17/30315 |
| | | | 707/644 |
| 2013/0179395 A1* | 7/2013 | Heman | G06F 17/30345 |
| | | | 707/609 |
| 2014/0136498 A1* | 5/2014 | Finis | G06F 17/30356 |
| | | | 707/695 |

* cited by examiner

FIG. 3A

Image 1

| RowId | A | B | C |
|---|---|---|---|
| 1 | 1 | 1 | 1 |
| 2 | 9 | 9 | 9 |

FIG. 3B

Forward delta data set 1

| RowId | A | B | C | Change |
|---|---|---|---|---|
| 1 | 1 | 2 | 3 | M |
| 2 | ~~9~~ | ~~9~~ | ~~9~~ | D |
| 3 | 2 | 2 | 2 | A |

FIG. 3C

Image 2

| RowId | A | B | C |
|---|---|---|---|
| 1 | 1 | 2 | 3 |
| 3 | 2 | 2 | 2 |

FIG. 3D

Backward delta data set 1

| RowId | A | B | C | Change |
|---|---|---|---|---|
| 1 | 1 | 1 | 1 | M |
| 2 | 9 | 9 | 9 | A |
| 3 | ~~2~~ | ~~2~~ | ~~2~~ | D |

FIG. 3E

Forward delta data set 2

| RowId | A | B | C | Change |
|---|---|---|---|---|
| 3 | 2 | 3 | 4 | M |
| 4 | 3 | 3 | 3 | A |

FIG. 3F

Image 3

| RowId | A | B | C |
|---|---|---|---|
| 1 | 1 | 2 | 3 |
| 3 | 2 | 3 | 4 |
| 4 | 3 | 3 | 3 |

FIG. 3G

Backward delta data set 2

| RowId | A | B | C | Change |
|---|---|---|---|---|
| 3 | 2 | 2 | 2 | M |
| 4 | ~~3~~ | ~~3~~ | ~~3~~ | D |

Combined backward delta data set

| RowId | A | B | C | Change |
|---|---|---|---|---|
| 1 | 1 | 1 | 1 | M |
| 2 | 9 | 9 | 9 | A |
| 3 |   |   |   | D |
| 4 |   |   |   | D |

FIG. 4A

Combined forward delta data set

| RowId | A | B | C | Change |
|---|---|---|---|---|
| 1 | 1 | 2 | 3 | M |
| 2 | 9 | 9 | 9 | D |
| 3 | 2 | 3 | 4 | A |
| 4 | 3 | 3 | 3 | A |

FIG. 4B

Example of maintenance policy

| Time Period | Frequency |
|---|---|
| Current week | Every extract |
| Previous 3 weeks | Weekly |
| Prior 48 weeks | Every 4 weeks |
| Prior year | Every 13 weeks |
| Everything before | None |

FIG. 5

COMMON EXTRACT STORE

FIELD OF THE INVENTION

Embodiments of the invention relate to a digital data store which may be efficiently used for disparate purposes.

BACKGROUND

Different computerized systems use data in different ways. The way in which data is used informs how the data is stored and maintained. To illustrate this widely recognized principle, the domains of data warehousing, operational reporting, and data archiving, and data feeds will be briefly discussed.

A data warehouse is a database used for generating reports and data analysis. To facilitate reporting and data analysis functions, data is often transformed and organized in star schemas within a data warehouse. Populating the data within the data warehouse is done via ETL (Extract, Transform, Load) operations, which requires that the ETL system maintain, in addition to the current state of the data warehouse, information about the last incremental data extractions obtained from the source tables. ETL operations propagate incremental changes made at the source tables into the star schemas of the data warehouse. ETL operations may transform the data prior to loading the data into the data warehouse. Examples of such types of transformation include data cleansing, data standardization, surrogate key generation, surrogate key replacement, unit of measure conversion, and currency conversion. Business intelligence (BI) applications use data gathered from a data warehouse or a subset of the warehouse called a data mart.

Operational reporting refers to reporting about operational details of current activity. For operational reporting, queries need to be performed against current data, in contrast to analytical reporting where historical data suffices and there is no requirement to query the latest data in real time. Therefore, operational reporting queries are performed against live systems to ensure the data is the most currently available. In operational reporting, the freshness of the data and a quick response time are valued more than storing large amounts of data over a long period of time.

Data archiving is the process of moving data that is no longer actively used to a separate data storage device for long-term retention. While data archiving requires saving both the current version of data as well as any historical version of data, it does not require the data to be stored in any particular format, such as a star schema. Speed of access is not a primary concern in data archiving, as data retained on a long-term basis in the data archive will not be accessed frequently but in contrast to data protection and backup products, the data in archiving products needs to be searchable and queryable by end users and eDiscovery applications.

Data feed systems allow users to receive updated data from data sources as the data changes at the data source. Data feed systems can supply data in the same format as the data source or in different formats (ex. star schema) which provide value add over the source format. Historical data feeds will supply, in addition to the current state of data at the data source, historical state of the data at a previous point in time.

Given the sharp differences in how data warehousing, operational reporting, data archiving, and data feeds are used, each of these approaches in practice are performed using separate persistent data stores that are designed to support the requirements of its intended use.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 3A is an illustration of a first state of data stored in the data repository in a discussion of generating a backward delta data set according to an embodiment of the invention;

FIG. 3B is an illustration of a first forward delta data set in a discussion of generating a backward delta data set according to an embodiment of the invention;

FIG. 3C is an illustration of a second state of data stored in the data repository in a discussion of generating a backward delta data set according to an embodiment of the invention;

FIG. 3D is an illustration of a first backward delta data set in a discussion of generating a backward delta data set according to an embodiment of the invention;

FIG. 3E is an illustration of a second forward delta data set in a discussion of generating a backward delta data set according to an embodiment of the invention;

FIG. 3F is an illustration of a third state of data stored in the data repository in a discussion of generating a backward delta data set according to an embodiment of the invention;

FIG. 3G is an illustration of a second backward delta data set in a discussion of generating a backward delta data set according to an embodiment of the invention;

FIG. 4A an illustration of the result of combining the backward delta data sets depicted in FIGS. 3D and 3G according to an embodiment of the invention;

FIG. 4B an illustration of the result of combining the forward delta data sets depicted in FIGS. 3B and 3E according to an embodiment of the invention;

FIG. 5 is an illustration of a maintenance policy according to an embodiment of the invention.

DETAILED DESCRIPTION OF THE INVENTION

Approaches for providing a common extract store are presented herein. The common extract store of an embodiment provides for a single persistent data store to service data queries originating from data warehousing applications, operational reporting applications, data archiving, and/or data feed applications. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

The prior art suffers from the burden of creating and maintaining separate data stores to support the many different ways in which data may be used. For example, the prior art employs separate data stores to support data warehousing applications, operational reporting applications, data archiving applications, and data feed applications. Maintaining separate data stores increases both the cost of ownership, latency and staleness concerns due to the time involved to populating duplicate data stores, and the likelihood of data inconsistencies arising between different data stores.

Advantageously, a common extract store of an embodiment allows a single persistent data store to service data queries originating from one or more of data warehousing applications, operational reporting applications, data archiving applications, and data feed applications. A common extract store of an embodiment is particularly tailored to service the needs of all these disparate services.

Figure 1:
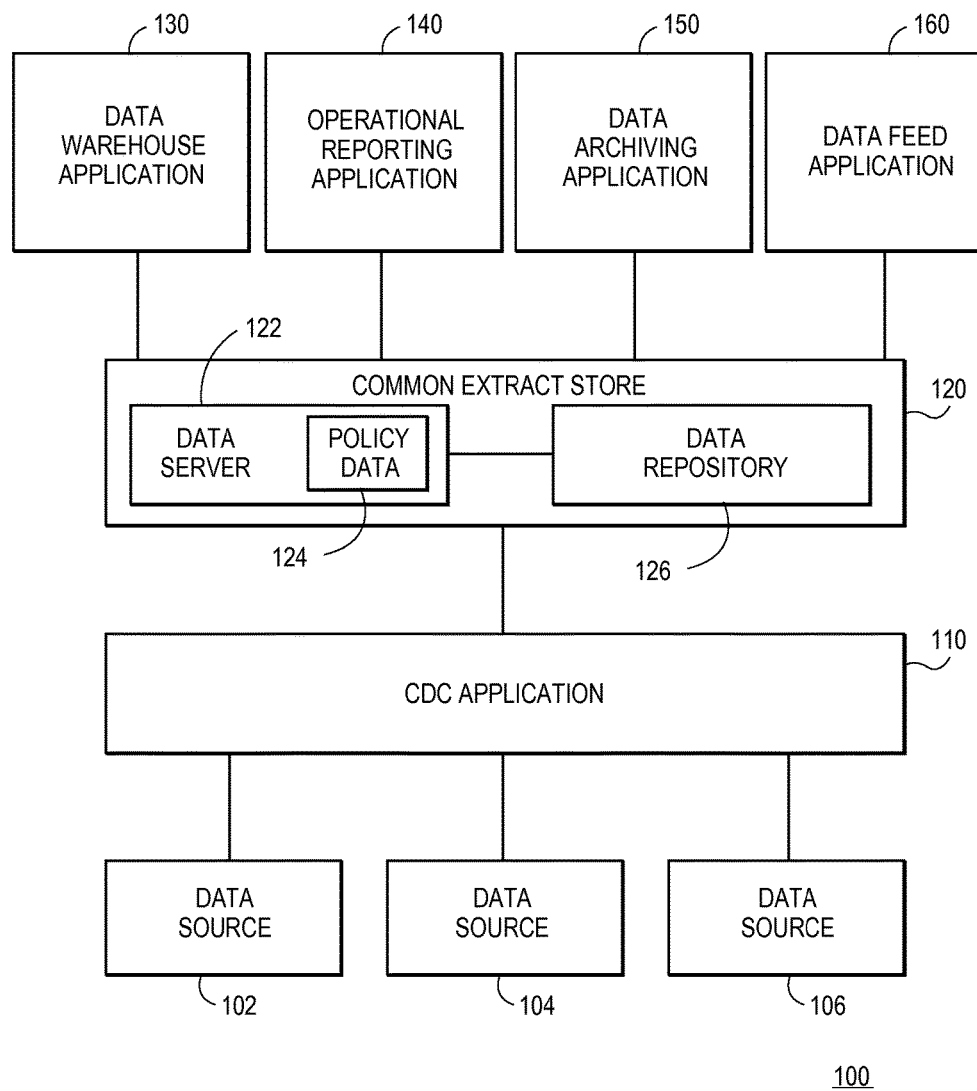
FIG. 1 is a block diagram of the components of a system according to an embodiment of the invention.

Prior to discussing in detail how a common extract store of an embodiment operates, it will be helpful to understand the environment in which it may be used. FIG. 1 is a block diagram of the components of a system 100 according to an embodiment of the invention. System 100 includes data sources 102, 104, and 106, CDC application 110, data store 120, data warehouse application 130, operational reporting application 140, and data archiving application 150, and data feed application 160.

Data sources 102, 104, and 106 are broadly meant to depict any source from which data may be obtained. In practice, one or more of data sources 102, 104, and 106 may correspond to business application sources like SalesForce, NetSuite, ServiceNow; data may be extracted from such business application sources using the API's provided thereby. As another example, one or more of data sources 102, 104, and 106 may correspond to public or government databases; for example, such databases may store information about weather, currency exchange rates, public government records, and the like. While only three data sources are depicted in FIG. 1; embodiments of the invention may be used with any number of data sources.

Change Data Capture (CDC) application 110, as broadly used herein, refers to an application for retrieving data from data sources 102, 104, and 106 and providing the data to common extract store 120. CDC application 110 may retrieve an initial extract of data from a data source and thereafter retrieve incremental extracts corresponds to the changes made at the data source since the data was last retrieved. For example, data may be extracted from a data source based on particular time intervals; a first request for records sent from CDC application 110 to a data source may retrieve all records modified between t1 and t2, the next request may retrieve all records modified between t2 and t3, the next request may retrieve all records modified between t3 and t4, and so on. Data extracted from a data source by CDC application 100 may be analyzed to determine if a particular record has been added, deleted, or modified. Processes for performing Change Data Capture (CDC) are well understood to those skilled in the art and will not be expounded upon herein.

Common extract store 120 of an embodiment provides for a single persistent data store to service data queries originating from data warehousing applications, operational reporting applications, data archiving, and/or data feed applications. Description of how common extract store 120 operates in detail will be presented below.

Common extract store 120 may comprise a data server 122 and a data repository 126. Data server 122, as broadly used herein, refers to a set of processes for receiving queries for data to be performed against data repository 126. Data server 122 performs those queries and provides the result to the entity that issued the request for data. Data server 122 may either comprise profile data 124 (as depicted in FIG. 1) or access profile data 124 stored separately therefrom. Profile data 124 may define a maintenance policy used in maintaining certain types of information (such as backward delta data set) used in the operation of common extract store 120, the operation of which will be described in further detail below.

Data repository 126, as used herein, refers to persistently stored data records arranged in a tabular format. Note that while data sources 102, 104, and 106 may store data in a wide variety of formats (such as, for example, tabular, flat file, CSV (comma separated values) or XML), data is converted into and stored in a tabular format in data repository 126.

Data warehouse application 130, operational reporting application 140, data archiving application 150, and data feed application 160, as broadly used herein, refer to applications or services which may issue queries for data to common extract store 120 and, in turn, use the data retrieved from extract store 120 in disparate ways. While system 100 depicts the inclusion of data warehouse application 130, operational reporting application 140, data archiving application 150, and data feed application 160, the presence of these applications is optional, as a particular implementation of system 100 need not include each of applications 130-160. Therefore, system 100 may include any combination of applications 130-160; nevertheless, regarding of the particular combination of applications 130-160 included within a particular implementation of system 100, common extract store 120 may service the needs of the included applications as described below.

Maintaining the Common Extract Store

Figure 2:
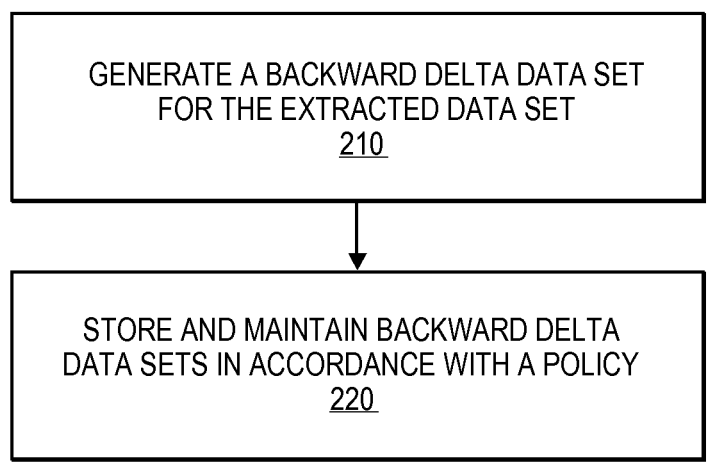
FIG. 2 is a flowchart illustrating the steps of maintaining a common extract store according to an embodiment of the invention.

FIG. 2 is a flowchart illustrating the steps of maintaining common extract store 120 according to an embodiment of the invention. Initially, in step 210, data server 122 analyzes the data stored in data repository 126 by CDC application 110 for purposes of generating a backward delta data set. A backward delta data set is a mechanism of an embodiment which enables common extract store 120 to store data that changes over time compactly while still supporting queries against data snapshot at any point in time. In an embodiment, a backward delta data set identifies what additions, deletions, and modifications need to be made to data stored in data repository 126 to cause a current version of the data repository 126 to return to a most recent version of data repository 126. Advantageously, in certain embodiments, all historical data reflecting any prior versions of data stored in data repository 126 is recorded in one or more backward delta data sets.

The generation of a backward delta data set will be described below with reference to FIGS. 3A-3G. For purposes of providing a clear explanation, assume that the current state of the data stored in the data repository 126 is shown in FIG. 3A. Thereafter, assume CDC application 110 retrieves an incremental data set from data source 102 and provides this incremental data set to data server 122. This incremental data set, depicted in FIG. 3B, may be referred to herein as a forward delta data set, due to its forward looking description of the change (or "delta") made to a data set. Note that CDC application 110 annotates the extracted data records with an identifier indicating whether the particular record is added, deleted, or modified. For example, as shown in FIG. 3B, the values in the Change column identify whether the values in the row have been modified (corresponding to an "M"), whether the values in the row have been deleted (corresponding to a "D"), or whether the values in the row have been added (corresponding to an "A").

Thereafter, server 122 applies the forward delta data set shown in FIG. 3B to the data stored in data repository 122 (shown in FIG. 3A). As a result, the data stored in the data repository will now correspond to that depicted in FIG. 3C. As shown in FIG. 3C, RowId 2 has been deleted, RowId 3 has been added, and RowId 1 has been modified with respect to the state of data repository 120 depicted in FIG. 3A.

Server 122 thereafter creates a backward delta data set shown in FIG. 3D. The backward delta data set of FIG. 3D identifies what additions, deletions, and modifications need to be made to data stored in data repository 126 to cause the version of the data repository 126 shown in FIG. 3C to return to the version of data repository 126 shown in FIG. 3A. In an embodiment, server 122 may create the backward delta data set shown in FIG. 3D by inverting the forward delta data set shown in FIG. 3B. The inversion process basically takes the "A" and "D" records of FIG. 3B and flips them to "D" and "A" respectively in the backward delta data set of FIG. 3D so the added records would need to be deleted from the new version of data repository 126 and deleted records added back to the result in the version of data repository 126 shown in FIG. 3A. The modified "M" records stay marked as modified but the actual modifications are reversed.

Server 122 will create a new backward delta data each time data is changed in data repository 126. To illustrate, FIG. 3E is an illustration a second forward delta data set retrieved from a data source and provided to server 122 by CDC application 110. Based on receiving this incremental data set, server 122 will apply the changes indicated by the forward delta data set shown in FIG. 3E to the current version of data stored in data repository 126 (depicted in FIG. 3C) to arrive at the version of data depicted in FIG. 3F. After data repository is updated to the state depicted in FIG. 3F, server 122 will generate another backward delta data set which identifies what additions, deletions, and modifications need to be made to data stored in data repository 126 to cause the version of the data repository 126 shown in FIG. 3F to return to the version of data repository 126 shown in FIG. 3C. This backward delta data set is depicted in FIG. 3G.

After generating a backward delta data set, in step 220, server 122 stores and maintains the backward delta data set and the forward delta data set in accordance with a policy (hereafter the "maintenance policy"). The maintenance policy may be defined by policy data 124 comprised within or accessible to server 122. To manage storage costs over time, the maintenance policy may instruct two or more backward delta data sets, associated with a continuous interval of time (such as a day, a week, a month, a year, and so on) be combined into a single backward delta data set after the expiration of a specified amount of time. Similarly, the maintenance policy may also instruct two or more forward delta data sets to be combined in this fashion as well. In certain embodiments, server 122 may perform a periodic scheduled compaction process to compact backward delta data sets and/or forward delta data sets to reclaim storage while ensuring the minimal coverage required by the policy. The storing and maintaining of the backward delta data set may be performed by server 122 in accordance with the policy by one or more software processes and without human intervention.

To illustrate how backward delta data sets may be combined, consider FIG. 4A, which is an illustration of the result of combining the backward delta data sets depicted in FIGS. 3D and 3G. Applying the combined backward delta data set depicted in FIG. 4A to the data set depicted in FIG. 3F would result in the data set depicted in FIG. 3A, as the combined backward delta data set applies all the changes necessary to do so.

FIG. 4B is an illustration of the result of combining the forward delta data sets depicted in FIGS. 3B and 3E according to an embodiment of the invention. Applying the combined forward delta data set depicted in FIG. 4B to the data set depicted in FIG. 3A would result in the data set depicted in FIG. 3F, as the combined forward delta data set applies all the changes necessary to do so.

As illustrated above with reference to FIGS. 4A and 4B, to combine two or more backward delta data sets, a union is performed on the changes made across the backward delta data sets and maintaining for reference the oldest image of the data for rows that occur in multiple backward delta data sets. Similarly, a combined forward delta data set can be obtained from a corresponding combined backward delta data set by flipping the Added and Deleted records in the combined backward delta data set and looking at the final image to get the values of Added and Modified records.

By relying upon the maintenance policy to determine when to (a) combine forward or backward delta data sets or (b) deleting one or more forward or backward delta data sets, the maintenance policy may specify the granularity of restore points available, as restore points are only available to a particular level of granularity for which delta data sets are available. The policy may additionally specify the moving of delta sets getting deleted or compacted to cheaper storage so that they are not completely lost, just removed from the more expensive primary storage.

For embodiments in which system 100 includes archiving application 150 and data feed application 160, common extract store 120 must make available historical data. Consequently, the policy followed may allow for more delta data sets to be maintained. Note that even in embodiments in which system 100 does not include application 150 and data feed application 160 or which does not require historical data to a fine level of granularity, the last few backward delta data sets are stored so that they may be used for recovery purposes.

In an embodiment, the maintenance policy may specify that backward delta data sets may be combined, even in embodiments comprising archiving application 150 and data feed application 160. This maintenance policy may be expressed as instructions for keeping a set of non-overlapping time periods with a frequency to keep backward delta data sets for each time period. To illustrate a concrete, non-limiting example, consider the maintenance policy depicted in FIG. 5. The maintenance policy shown in FIG. 5 specifies that (a) all backward delta data sets associated with a point in time within the current week (and prior to the current data extraction) are combined upon each new data extraction from a data source, (b) all backward delta data sets associated with a point in time within the previous three weeks are combined once a week, (c) all backward delta data sets associated with a point in time within the previous forty-eight weeks are combined every four weeks, (d) all backward delta data sets associated with a point in time within the prior year are combined every thirteen weeks, (e)

all backward delta data sets associated with a point in time before a certain date are dropped. The example of FIG. 5 is merely illustrative of one format of a maintenance policy, as other embodiments may develop maintenance policies considering additional variables or having further levels of granularity.

Common extract store 120 is equipped to handle schema changes which may occur over time. If a column is added to data repository 126, the backward delta data set associated with that change would remove the column. In this way, by applying the backward delta data set (which removes the column) to the current version of data repository 126 (which possesses the column), the data repository 126 may be properly returned to the prior state in which data repository 126 lacked the column (as it was removed by the application of the backward delta data set). Similarly, if a column is removed from data repository 126, the backward delta data set associated with that change would add the column. In this way, by applying the backward delta data set (which adds the column) to the current version of data repository 126 (which lacks the column), the data repository 126 may be properly returned to the prior state in which data repository 126 possessed the column (as it was added by the application of the backward delta data set). Column modifications can be treated as additions and deletions of columns and may be handled in the same fashion.

The schema employed by data repository 126 supports two flavors—Source Specific and Source Independent. The Source specific flavor mimics the schema at a data source, while the Source Independent flavor is derived from a target warehouse model and is independent of any data source. For example, in accordance with the Source Specific flavor, the schema of data repository 126 may be the same as employed by data source 102 (note that data source 102 may be the only data source in this example).

Embodiments may support both schema flavors in data repository 126 without persisting the data in both formats. Rather than persisting the data in both formats, only the metadata definitions of the two schemas and the mapping from source specific to source independent are persisted. If the needs of a particular implementation do not require data to be stored within data repository 126 in conformance to schema format employed by a particular data source, then data extracted in the source specific format from a particular data source may be stored in data repository 126 in a source independent format. On the other hand, if the needs of a particular implementation do require data in the source specific format, data repository 126 will present data in that source specific format and generate the source independent format on the fly based on the stored mappings between the two formats. If a particular implementation requires both formats and the extra storage cost is not a concern, then data repository 126 may persistent the data in both formats. While these examples involve only two schemas, embodiments of the invention may support any number of schemas so long as the mappings between formats are persisted.

Server 122 may use the mapping between schema formats in an automated fashion without human involvement, instruction, or intervention. To illustrate, upon server 122 receiving a query for data to be performed against a particular version of a schema of data repository 126, without human intervention server 122 may consult the metadata that identifies a mapping between the tabular format of data repository 126 and the particular version of a schema. Thereafter, server 122 may convert, using the metadata and without human intervention, the tabular format data repository 126 into a converted data set in the particular version of the schema and may perform the query against the converted data set.

The use of backward delta data sets and the support for source specific and independent schemas that may change over time by common extract store 120 serves the needs of the different data warehousing, operational reporting, data archiving, and data feed applications. To illustrate, data warehouse application 130 makes use of the current version of data in data repository 126 stored in the Source Independent format and the most recent forward delta data set to perform ETL processing. If a need arises to rollback the data warehouse to an earlier point in time, then backward delta data sets may be successively applied to obtain a data image at the desired point in time, and thereafter the ETL processing may be performed using the roll backed image. In fact, given that data repository 126 has a superset of data (schema wise) from the data warehouse and given the presence of historical delta data sets, the data warehouse may be created from scratch.

Embodiments of the invention support operational reporting application 140 by leveraging that the extractions of data from data sources 102, 104, and 106 are very frequent. Further, the Source Independent schema format of data repository 126 is derived from the data warehouse model, thereby allowing for reports based of the data warehouse model to be run against common extract store 120 for the latest data when that data hasn't been loaded into the data warehouse. Reports may be run against the most recent forward delta data set if only that increment is desired; alternatively reports may be run against the current version of data repository 126 if the full data set is desired.

To support data archiving application 150, common extract store 120 support queries with an optional time period specified. If the time period isn't specified in the query then the query is performed against the current image of data repository 126. If a time period is specified in the query, then backward delta data sets are applied to the current image of data repository 126 to obtain an image of data repository 126 associated with the time period specified in the query. To perform repeated analysis over a time period (as in eDiscovery cases), the image of data repository 126 for that time period may be persisted so that repeatedly applying backward delta data sets may be avoided in the performance of each query involving this time period.

To support data feed application 160, the data of the data feed may be assembled based on the feed query from the final image or from any prior point in time if specified in the query by applying the backward delta data sets.

Hardware Mechanisms

Figure 6:
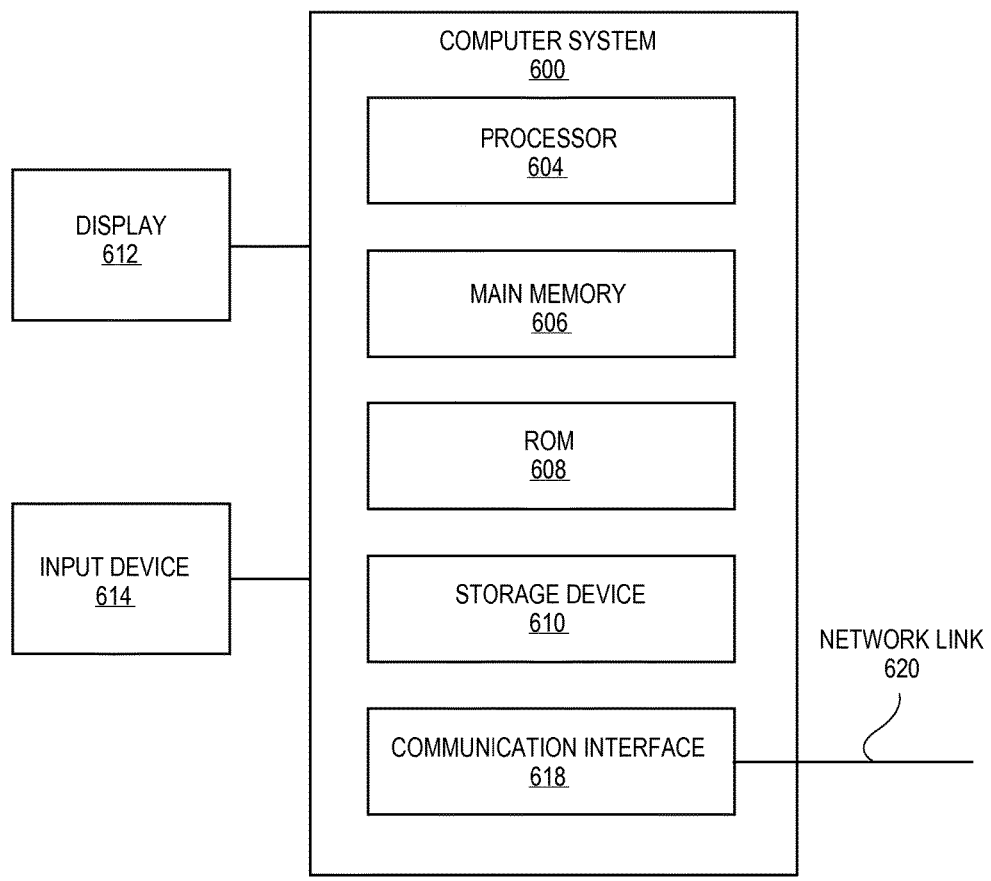
FIG. 6 is a block diagram that illustrates a computer system upon which an embodiment of the invention may be implemented.

In an embodiment, each of the software components depicted in FIG. 1 may be implemented on one or more computer systems. FIG. 6 is a block diagram that illustrates a computer system 600 upon which an embodiment of the invention may be implemented. In an embodiment, computer system 600 includes processor 604, main memory 606, ROM 608, storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device for storing static information and instructions for processor 604. A storage device 610, such as a magnetic disk or optical disk, is provided for storing information and instructions.

Computer system 600 may be coupled to a display 612, such as a cathode ray tube (CRT), a LCD monitor, and a television set, for displaying information to a user. An input device 614, including alphanumeric and other keys, is coupled to computer system 600 for communicating information and command selections to processor 604. Other non-limiting, illustrative examples of input device 614 include a mouse, a trackball, or cursor direction keys for communicating direction information and command selections to processor 604 and for controlling cursor movement on display 612. While only one input device 614 is depicted in FIG. 6, embodiments of the invention may include any number of input devices 614 coupled to computer system 600.

Embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 604 for execution. For example, the instructions may initially be carried on a magnetic disk of a remote computer. The remote computer can load the instructions into its dynamic memory and send the instructions over a network link 620 to computer system 600.

Communication interface 618 provides a two-way data communication coupling to a network link 620 that is connected to a local network. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through a local network to a host computer or to data equipment operated by an Internet Service Provider (ISP).

Computer system 600 can send messages and receive data, including program code, through the network(s), network link 620 and communication interface 618. For example, a server might transmit a requested code for an application program through the Internet, a local ISP, a local network, subsequently to communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for providing a persistent data store, which when executed by one or more processors, causes:

at predetermined points in time, extracting a data set from one or more data sources, wherein the extracting comprises converting the extracted data set into one or more tables, and concatenating and storing the one or more tables of the extracted data set in the persistent data store in a single logical table having a tabular format, wherein the tabular format comprises a logical representation of a current version of the data set available within one or more data sources, and wherein storing the extracted data set comprises:

generating a backward delta data set that identifies a set of operations, including any additions, deletions, and modifications, which need to be made to data stored in the tabular format of the data store to cause a current version of the persistent data store to return to a most recent version of the persistent data store, and storing and maintaining the backward delta data set in accordance with a policy that instructs two or more backward delta data sets, associated with a continuous interval of time, be combined into a single backward delta data set after the expiration of a specified amount of time;

upon receiving a query to be performed against a particular state of the data store at a particular point in time, (a) identifying a set of backward delta data sets associated with all time periods at least as recent as the particular point in time, (b) applying the set of backward delta data sets to the current version of the data store to obtain a historical version of the data store, and (c) performing the query against the historical version of the data store; and upon receiving a query for data satisfying a set of criteria to be performed against a particular version of a schema, without human intervention:
consulting a metadata that identifies a mapping between the tabular format of the persistent data store and the particular version of a schema, and
converting, using the metadata and without human intervention, the tabular format of the persistent data store into a converted data set in the particular version of the schema and performing the query against the converted data set.

2. The non-transitory computer-readable storage medium of claim 1, wherein the data store is used to service data queries originating from (a) one or more data warehousing applications, (b) one or more operational reporting applications, and (c) one or more data archiving, and (d) one or more data feed applications.

3. The non-transitory computer-readable storage medium of claim 1, wherein execution of the one or more sequences of instructions further causes:

upon determining that the extracted data set indicates a column in a particular data source has been removed, (a) updating the tabular format of the data store to remove a corresponding column associated with the removed column, and (b) configuring the backward delta data set associated with the extracted data set to add the corresponding column back to the tabular format of the data store; and upon determining that the extracted data set indicates a new column in the particular data source has been added, (a) updating the tabular format of the data store to add a new corresponding column associated with the new column, and (b) configuring the backward delta data set associated with the extracted data set to remove the new corresponding column from the tabular format of the data store.

4. The non-transitory computer-readable storage medium of claim 1, wherein all historical data reflecting any prior versions of data stored by the persistent data store is recorded in one or more backward delta data sets.

5. The non-transitory computer-readable storage medium of claim 1, wherein the storing and maintaining the backward delta data set is performed without human intervention by one or more software processes.

6. An apparatus providing a persistent data store, comprising:
one or more processors; and
one or more sequences of instructions, which when executed by the one or more processors, causes:
at predetermined points in time, extracting a data set from one or more data sources, wherein the extracting comprises converting the extracted data set into one or more tables, and concatenating and storing the one or more tables of the extracted data set in the persistent data store in a single logical table having a tabular format, wherein the tabular format comprises a logical representation of a current version of the data set available within one or more data sources, and wherein storing the extracted data set comprises:
generating a backward delta data set that identifies a set of operations, including any additions, deletions, and modifications, which need to be made to data stored in the tabular format of the data store to cause a current version of the persistent data store to return to a most recent version of the persistent data store, and
storing and maintaining the backward delta data set in accordance with a policy that instructs two or more backward delta data sets, associated with a continuous interval of time, be combined into a single backward delta data set after the expiration of a specified amount of time;
upon receiving a query to be performed against a particular state of the data store at a particular point in time, (a) identifying a set of backward delta data sets associated with all time periods at least as recent as the particular point in time, (b) applying the set of backward delta data sets to the current version of the data store to obtain a historical version of the data store, and (c) performing the query against the historical version of the data store; and
upon receiving a query for data satisfying a set of criteria to be performed against a particular version of a schema, without human intervention:
consulting a metadata that identifies a mapping between the tabular format of the persistent data store and the particular version of a schema, and
converting, using the metadata and without human intervention, the tabular format of the persistent data store into a converted data set in the particular version of the schema and performing the query against the converted data set.

7. The apparatus of claim 6, wherein the data store is used to service data queries originating from (a) one or more data warehousing applications, (b) one or more operational reporting applications, and (c) one or more data archiving, and (d) one or more data feed applications.

8. The apparatus of claim 6, wherein execution of the one or more sequences of instructions further causes:

upon determining that the extracted data set indicates a column in a particular data source has been removed, (a) updating the tabular format of the data store to remove a corresponding column associated with the removed column, and (b) configuring the backward delta data set associated with the extracted data set to add the corresponding column back to the tabular format of the data store; and upon determining that the extracted data set indicates a new column in the particular data source has been added, (a) updating the tabular format of the data store to add a new corresponding column associated with the new column, and (b) configuring the backward delta data set associated with the extracted data set to remove the new corresponding column from to the tabular format of the data store.

9. The apparatus of claim 6, wherein all historical data reflecting any prior versions of data stored by the persistent data store is recorded in one or more backward delta data sets.

10. The apparatus of claim 6, wherein the storing and maintaining the backward delta data set is performed without human intervention by one or more software processes.

11. A method for providing a persistent data store, comprising:
at predetermined points in time, extracting a data set from one or more data sources, wherein the extracting comprises converting the extracted data set into one or more tables, and concatenating and storing the one or more tables of the extracted data set in the persistent data store in a single logical table having a tabular format, wherein the tabular format comprises a logical representation of a current version of the data set available within one or more data sources, and wherein storing the extracted data set comprises:

generating a backward delta data set that identifies a set of operations, including any additions, deletions, and modifications, which need to be made to data stored in the tabular format of the data store to cause a current version of the persistent data store to return to a most recent version of the persistent data store, and storing and maintaining the backward delta data set in accordance with a policy that instructs two or more backward delta data sets, associated with a continuous interval of time, be combined into a single backward delta data set after the expiration of a specified amount of time;

upon receiving a query to be performed against a particular state of the data store at a particular point in time, (a) identifying a set of backward delta data sets associated with all time periods at least as recent as the particular point in time, (b) applying the set of backward delta data sets to the current version of the data store to obtain a historical version of the data store, and (c) performing the query against the historical version of the data store; and upon receiving a query for data satisfying a set of criteria to be performed against a particular version of a schema, without human intervention:

consulting a metadata that identifies a mapping between the tabular format of the persistent data store and the particular version of a schema, and converting, using the metadata and without human intervention, the tabular format of the persistent data store into a converted data set in the particular version of the schema and performing the query against the converted data set.

12. The method of claim 11, wherein the data store is used to service data queries originating from (a) one or more data warehousing applications, (b) one or more operational reporting applications, and (c) one or more data archiving, and (d) one or more data feed applications.

13. The method of claim 11, further comprising:

upon determining that the extracted data set indicates a column in a particular data source has been removed, (a) updating the tabular format of the data store to remove a corresponding column associated with the removed column, and (b) configuring the backward delta data set associated with the extracted data set to add the corresponding column back to the tabular format of the data store; and upon determining that the extracted data set indicates a new column in the particular data source has been added, (a) updating the tabular format of the data store to add a new corresponding column associated with the new column, and (b) configuring the backward delta data set associated with the extracted data set to remove the new corresponding column from to the tabular format of the data store.

14. The method of claim 11, wherein all historical data reflecting any prior versions of data stored by the persistent data store is recorded in one or more backward delta data sets.

15. The method of claim 11, wherein the storing and maintaining the backward delta data set is performed without human intervention by one or more software processes.

* * * * *

UNITED STATES PATENT AND TRADEMARK OFFICE
CERTIFICATE OF CORRECTION

PATENT NO. : 9,886,490 B1
APPLICATION NO. : 14/215547
DATED : February 6, 2018
INVENTOR(S) : Rahul Kapoor et al.

Page 1 of 1

It is certified that error appears in the above-identified patent and that said Letters Patent is hereby corrected as shown below:

On the Title Page

Item (73), please delete the listed state "DE" associated with the Assignee, and in its place please insert --CA--.

Signed and Sealed this
Twenty-second Day of May, 2018

Andrei Iancu
*Director of the United States Patent and Trademark Office*